Jan. 30, 1968  J. ALBERANI  3,366,315
PRESSURE REGULATOR
Filed Aug. 25, 1965
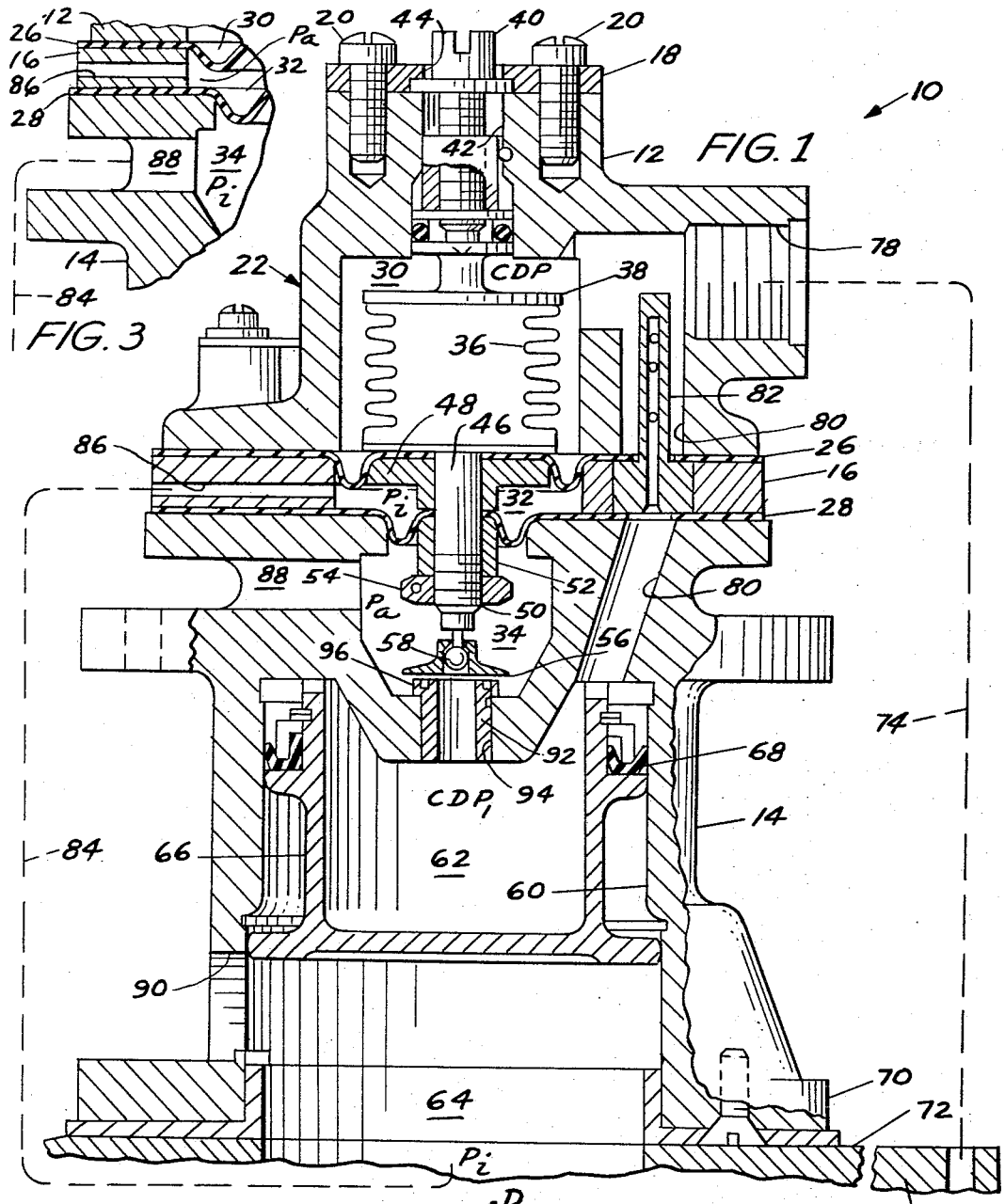
FIG. 1
FIG. 3
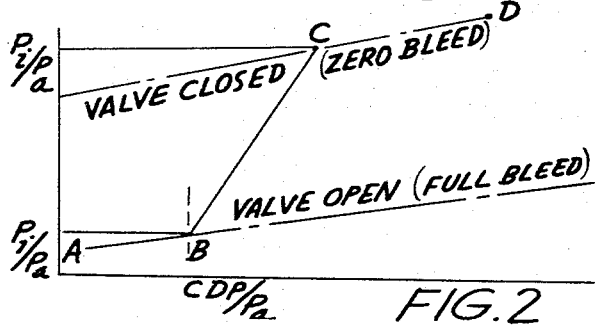
FIG. 2
INVENTOR.
JULIUS ALBERANI
BY Walter Potnak Jr.
John P. Moran
ATTORNEYS

United States Patent Office 3,366,315
Patented Jan. 30, 1968

3,366,315
PRESSURE REGULATOR
Julius Alberani, Birmingham, Mich., assignor to Holley Carburetor Company, Warren, Mich., a corporation of Michigan
Filed Aug. 25, 1965, Ser. No. 482,524
11 Claims. (Cl. 230—114)

ABSTRACT OF THE DISCLOSURE

This application disclosed a pressure regulator, specifically a gas turbine engine compressor bleed control including a housing, a pair of openings in the housing communicating a selected stage of the compressor with atmosphere, a piston slidably mounted in the housing for varying the size of the opening leading to the atmosphere, the piston serving to bleed off the selected stage of the compressor over some predetermined compressor pressure ratio range, a computer system including a linearly movable member, a pair of diaphragms connected to the member, a poppet type servo valve connected to one end of the member, and a valve seat for the poppet valve communicating the side of the piston opposite the selected stage with atmosphere, a conduit for communicating a compressor pressure greater than that of the selected stage to the computer system and the side of the piston opposite the selected stage, and a conduit for communicating the pressure of the selected stage with the computer system.

---

This invention relates generally to pressure regulators, and more particularly to gas turbine engine compressor bleed controls.

Compressor bleed controls previously used have been primarily of the so-called snap-action type. In other words, they "snapped" from the fully open to the fully closed position, and vice versa, once the stall region was passed, over a relatively small range of compressor pressure ratio, the latter term being defined as the ratio of compressor discharge pressure (CDP) to compressor inlet pressure ($P_a$). Such fast action is not satisfactory in many applications, such as in gas turbine engines used on helicopters or in any other multi-speed engines wherein the bleeding beyond the stall range must be controlled over a somewhat longer predetermined compressor pressure ratio range in order to assure stability and proper control of the helicopter or other unit particularly during some transition-speed range wherein sudden undesirable surges or thrusts must be avoided.

For the above reasons, compressor bleed controls have been suggested, wherein the bleeding takes place over a controlled compressor pressure ratio range. While some of these devices (see U.S. application, Ser. No. 354,725, filed on Mar. 25, 1964, now Patent No. 3,298,600, in the name of Paul F. Likavec) have performed satisfactorily, they have been rather complex and expensive.

Accordingly, a primary object of the invention is to provide a compact, inexpensive and efficient pneumatic compressor bleed control mechanism.

Another object of the invention is to provide such a device wherein the bleeding takes place over a controlled compressor pressure ratio range.

A more specific object of the invention is to provide such a device wherein a servo pressure is obtained by diverting the compressor discharge pressure across a fixed restriction in a branch passageway and into a chamber having one side thereof formed by a piston located adjacent the particular compressor stage being bled. The servo pressure thus obtained in the chamber is controlled over a predetermined range by a poppet type servo valve whose opening is determined by a pneumatic computing section the latter not including a lever arrangement as was the case in the above mentioned application. The piston is caused to move by a change in the regulated servo pressure to progressively control the amount of interstage pressure being bled off past the other side of the piston.

Still another object of the invention is to provide such a device which may be easily and quickly adjusted for use on a particular engine or for different engine applications.

A still further object of the invention is to provide such a device which automatically compensates for ambient pressure changes due to changes in altitude.

Other more specific objects and advantages of the invention will become more apparent when reference is made to the following specification and illustrations wherein:

FIGURE 1 is a cross-sectional view of a compressor bleed control embodying the invention;

FIGURE 2 is a graph of Interstage Pressure vs. Compressor Discharge Pressure at sea level conditions illustrative of the operation of the invention;

FIGURE 3 is a fragmentary cross-sectional view illustrating a modification of the invention.

Referring now to FIGURE 1 in greater detail the pressure regulator 10 may include upper and lower bodies 12 and 14, an intermediate disk member 16 and a cover plate 18. The plate 18 may be secured to the upper body 12 by any suitable means, such as screws 20. The members 12, 14 and 16 form a central computing section 22. A pair of pressure responsive devices, such as diaphragms 26 and 28, are confined at their outer edges between the upper body 12 and the member 16, and between the member 16 and the lower body 14, respectively, serving to divide the computing section 22 into chambers 30, 32 and 34.

A resilient pressure responsive means, such as an evacuated bellows 36, is mounted in the chamber 30 between an abutment 38 and the diaphragm 26. The position of the abutment 38, and hence the fixed length of the bellows 36, may be manually adjusted by virtue of a screw 40 threadedly mounted in an opening 42 in the upper body 12, through an opening 44 in the cover plate 18. A stem 46 extends from the bellows 36, through an opening in the center of the diaphragm 26 and across the chamber 32. A spacer 48 mounted around the stem 46 maintains the diaphragms 26 and 28 a fixed distance apart, as will be explained. The stem 46 also extends through an opening in the center of the opposing diaphragm 28 and includes threads 50 formed on the end thereof.

A diaphragm retainer 52 is slidably mounted around the stem 46 in the chamber 34, confining the diaphragm 28 against the spacer 48. The retainer 52, the spacer 48 and the diaphragms 26 and 28 are held in place adjacent the bellows 36 by any suitable means, such as a nut 54. A poppet valve 56 is secured to the threaded end 50 of the stem 46. If desired, the valve 56 may be swivally mounted on a ball extension 58 formed on the end 50.

A cavity 60, formed in the lower body 14, is divided into two variable chambers 62 and 64 by means of a slidably mounted piston 66 for a purpose to be described later. A suitable seal 68 may surround the piston 66 to prevent leakage between the chambers 62 and 64, the former being referred to hereinafter as the servo chamber 62.

The body 14 may further include a flange 70 for mounting the pressure regulator 10 against the wall of some particular stage of a gas turbine engine compressor, represented generally as 72.

The conduit 74 communicates between the outlet end 76 of the compressor 72 and an inlet 78 into the chamber 30. A passage 80 including a fixed restriction 82 communicates between the inlet 78 and the chamber 62. Another conduit 84 communicates between the selected stage of the compressor 72 and an opening 86 into the chamber 32, between the diaphragms 26 and 28. An opening 88 to the atmosphere is formed in the wall of the chamber 34, while a second atmospheric bleed 90 is formed in the wall of the chamber 64.

Communication between the chamber 34 of the computing section 22 and the servo chamber 62 is established by means of a bushing 92 press-fitted into an opening 94 formed at the interior of the body 14. An extension 96 of the bushing 92 into the chamber 34 serves as a valve seat for the poppet valve 56, for a purpose to be described later.

Operation

Turbine engines, regardless of whether they employ a single spool compressor or a split spool compressor, frequently encounter the problem of compressor stall. This characteristic occurs because the various stages of the compressor, as a unit, can operate at maximum efficiency at one particular compressor speed. At speeds lower than design speed, the various stages are not correctly matched to handle the total air flow. The tendency of the first stages to supply more air than subsequent stages can accommodate results in a stall of certain compressor stages and causes surging air flow and pulsations of pressure. If allowed to continue, the resultant engine vibrations can lead to damage to the compressor. This problem is overcome, as previously indicated, by the provision of a suitable pressure regulator 10 which serves to bleed off a selected stage of the compressor 76 over some predetermined compressor pressure ratio range. The gain in compressor performance more than compensates for the loss of work done in compressing the air which is being bled off.

Referring now to FIGURE 1, it may be noted that compressor discharge air at a pressure CDP is fed into the chamber 30 via the conduit 74 and the inlet 78, and also into the branch passageway 80. CDP drops across the fixed restriction 82, resulting in a somewhat lower pressure $CDP_1$ in the servo chamber 62. Air at a pressure $P_i$ from a selected stage of the compressor 76 is communicated via the conduit 84 to the chamber 32. This interstage pressure $P_i$ is also present in the chamber 64 on the compressor side of the piston 66, opposite the servo chamber 62. Ambient air at a pressure $P_a$ is directed to the chamber 34 through the opening 88 in the wall of the housing 14.

The pressure differentials $CDP-P_i$ and $P_i-P_a$ act across the diaphragms 26 and 28, respectively. The effect of these pressure differentials is to vary the opening between the poppet valve 56 and the fixed valve seat 96 by linearly displacing stem 46. It should be noted that, in view of the difference in areas of diaphragms 26 and 28, the force resulting from pressure $P_i$ in the chamber 32 is in an upward direction.

It is obvious that, with the valve 56 closed, the pressure $CDP_1$ in the servo chamber 62 approaches the value of CDP. However, with the poppet valve 56 open, air will flow from the servo chamber 62 through the bushing 92 into the central chamber 34, reducing the pressure $CDP_1$ in the chamber 62 to a value slightly greater than the ambient air pressure $P_a$.

The specific purpose of controlling the movement of the diaphragms 26 and 28 in response to changes in pressures CDP and $P_i$ is to set the poppet valve 56 opening such that the generated pressure $CDP_1$, as a function of CDP, is substantially equal to pressure $P_i$ over the transition range of line B–C of FIGURE 2, less than $P_i$ during the "valve open" range A–B and greater than $P_i$ during the "valve closed" range C–D. The areas of the piston 66, which are exposed to pressure $CDP_1$ on the one side thereof and to pressure $P_i$ on the other side thereof, are substantially equal in the embodiment shown in FIGURE 1. The piston 66 will thus seek a position of equilibrium throughout the transition range B–C, allowing the proper amount of interstage air to be bled off past the compressor side of the piston 66, through the chamber 64 and the outlet 90, to the atmosphere, thereby maintaining the relationship, $P_i = CDP_1$.

The setting of the poppet valve 56 opening so as to produce the sloped transition effect B–C (FIGURE 2) is accomplished through the use of a feedback system. Referring again to FIGURE 1, it may be noted that, if the so-called feedback diaphragm 28 and the chamber 32 were not included in the computing section, once the single diaphragm 26 were overcome by a sufficiently high CDP pressure in the chamber 16, the valve 56, being connected to the diaphragm 26, would quickly close against the valve seat 96, causing the piston 66 to move suddenly under the force of increased pressure $CDP_1$ in the servo chamber 62, so as to completely close off the bleed port 90.

The effect of having the feedblock diaphragm 28 and the chamber 32 incorporated in the system is that as CDP in the passages 74 and 80 increases, so also does $CDP_1$ in the chamber 62, but at a faster rate than CDP, due to the reducing opening 56/96 resulting from the downward movement of the valve 56 caused by the increased force on the diaphragm 26. The increased $CDP_1$ tends to move the piston 62 downwardly, thereby increasing the pressure $P_i$ by virtue of the fact that less $P_i$ bleeds off through the outlet port 90. The increase in pressure $P_i$ is fed back to the chamber 32 via the conduit 84 and would act as a counterforce to the downward effect of CDP on the diaphragm 26. This retards the travel of the valve 56 toward the valve seat 96, allowing additional $CDP_1$ to bleed off through the opening 56/96, thereby continually bringing $CDP_1$ toward a state of equilibrium with $P_i$.

Should CDP increase so suddenly that the piston 66 closes further than it should, the resultant feedback force of $P_i$ in the chamber 32 will cause the stem 46 and, consequently, the valve 56 to move linearly upwardly once again until the system is in equilibrium. Anytime that CDP levels off, while the piston is at some intermediate point, the poppet valve 56 will seek a position wherein the computer system 22 is in equilibrium, resulting in $CDP_1$ and $P_i$ on opposite sides of the piston 66 being equal; hence, the piston 66 will maintain its particular intermediate position.

The over-all closing effect of the above phenomenon is along the upwardly sloped transition line B–C of FIGURE 3, over a controlled compressor pressure ratio range, rather than at some particular compressor pressure ratio or over a much smaller range. With a decrease in CDP, and, hence, in $CDP_1$ in the chamber 62, the reverse effect will be true, i.e., a downward transition along the line C–B.

Once CDP has increased to the point where the $CDP/P_a$ ratio reaches point C, (FIGURE 2), the valve 56 will have closed against the seat 96, and will remain closed throughout all values of $CDP/P_a$ greater than that represented by point C, FIGURE 2, the result being along the line C–D.

In the above described system 10, vertical adjustment of point B along the dash line of FIGURE 3 suitable for different engine applications has been provided for by means of the manually adjustable screw 40 operatively connected to the bellows 36, serving to change the initial spring rate of the bellows 36. The slope of the line B–C may be changed by changing the effective diameters of the diaphragms 26 and 28. It may be noted that either a spring or, in lieu thereof, the bellows 36 is required in the chamber 36 in order to oppose the initial preload on the diaphragms 26 and 28. In other words, the $P_i/P_a$ ratio is not equal to zero when the $CDP/P_a$ ratio is equal to zero, resulting in the initial preload. The practical effect of using an evacuated bellows 36 in lieu of a spring is that the bellows permits the pressure regulator 10 to be used in aircraft applications, wherein the ambient pressure varies with altitude. The evacuated bellows serves to maintain the $P_i/P_a$ ratio substantially constant, the slight error resulting from the very small movement of the valve 56 having a negligible effect on the slope of the line B–C.

As illustrated in the modification of FIGURE 3, wherein those components which are the same as those of FIGURE 1 bear the same reference numerals, the conduit 84 communicates with the opening 86 leading into the chamber 32, rather than with the outlet 88. This leaves the outlet 86 to serve as an atmospheric opening instead of the opening 88, as in the case with FIGURE 1. In the embodiment of FIGURE 3, calculations and tests indicate that the effective areas of the diaphragms 26 and 28 must be varied from those of FIGURE 1, and, since CDP approaches $P_i$ rather than $P_a$ when the poppet valve 56 is open, it is essential that the bottom area of the piston 66 be greater than the upper area so that pressure $P_i$ in the chamber 64 can raise the piston 66 upon a decrease in $CDP_1$.

It should now be apparent that the bleed control mechanism 10 performs a bleeding function over a predetermined substantial compressor pressure ratio range, thereby providing the stability and control required by helicopters and other multi-speed engines.

It should be further apparent that the control is of a very compact and yet highly reliable design, utilizing a minimum of component parts.

While but two modifications of the invention have been disclosed and described, it is apparent that other modifications of the invention are possible within the scope of the appended claims.

What I claim as my invention is:

1. For use with a gas turbine engine compressor, a pressure regulator comprising a housing including a pair of openings communicating between a selected stage of said compressor and the atmosphere around said housing, a piston slidably mounted in said housing for varying the size of said opening leading to the atmosphere, a computer system including a pair of diaphragms mounted a fixed distance apart, conduit means for communicating a compressor pressure greater than that of said selected stage to said computer system and to the side of said piston opposite said selected stage, means for communicating the pressure of said selected stage with said computer system at a point between said pair of diaphragms, and means for causing the pressure adjacent said piston opposite said selected stage to equal the pressure at said selected stage over a predetermined compressor pressure-ambient pressure ratio range.

2. For use with a gas turbine engine compressor, a pressure regulator comprising a housing including a pair of openings communicating between a selected stage of said compressor and the atmosphere around said housing, a piston slidably mounted in said housing for varying the size of said opening leading to the atmosphere, a computer system including a pair of diaphragms mounted a fixed distance apart, conduit means for communicating compressor discharge pressure to said computer system and to the side of said piston opposite said selected stage, means for communicating the pressure at said selected stage with said computer system at a point between said pair of diaphragms and means for causing the pressure adjacent said piston opposite said selected stage to equal the pressure at said selected stage over a predetermined compressor discharge pressure-ambient pressure ratio range.

3. The device as described in claim 2, wherein said computer system includes means for automatically compensating for changes in altitude.

4. The device described in claim 3, including means whereby said means for compensating for changes in altitude may be manually adjusted.

5. In a gas turbine engine compressor, a pressure regulator comprising a plurality of chambers, a pair of pressure responsive devices forming movable walls for three of said plurality of chambers, means for maintaining said pair of pressure responsive devices a fixed distance apart, a third pressure responsive device secured to one of said pair of pressure responsive devices in the first of said three chambers, valve means secured to the other of said pair of pressure responsive devices in the third of said plurality of chambers, a slidably mounted piston serving as a movable wall between the fourth and fifth of said plurality of chambers, a passage communicating between said fourth chamber and said third chamber, the outlet of said opening serving as a valve seat for said valve means, a first outlet to the atmosphere from said third chamber, a second outlet to the atmosphere from said fifth chamber, a first conduit communicating between a point along said compressor and said first chamber, a second conduit communicating between a stage of said compressor downstream of said point along said compressor and the second of said plurality of chambers between said pair of pressure responsive devices, and a passage including a fixed restriction communicating between said fourth chamber and said first chamber.

6. In a gas turbine engine compressor, a pressure regulator comprising a plurality of axially aligned cylindrical chambers, a pair of diaphragms forming movable walls for three of said plurality of axially aligned chambers, means for maintaining said pair of diaphragms a fixed distance apart, a bellows secured to one of said pair of diaphragms in the first of said three chambers, valve means secured to the other of said pair of diaphragms in the third of said plurality of axially aligned chambers, a slidably mounted piston serving as a movable wall between the fourth and fifth of said plurality of axially aligned chambers, a passage communicating between said fourth chamber and said third chamber, said valve means controlling communication therebetween, the outlet of said opening serving as a valve seat for said valve means, a first outlet to the atmosphere from said third chamber, a second outlet to the atmosphere from said fifth chamber, a first conduit communicating between the discharge of said compressor and said first chamber, a second conduit communicating between a stage of said compressor and the second of said plurality of chambers between said pair of diaphragms, and a passage including a fixed restriction communicating between said fourth chamber and said first chamber.

7. The device described in claim 6, including means manually adjusting the initial length of said bellows.

8. A pressure regulator, comprising means for providing and controlling a servo pressure as a function of a selected pressure, said means including an actuated member and a plurality of pressure responsive devices connected to actuate said member, said member being movable only linearly by said pressure responsive devices, means for subjecting one of said pressure responsive devices to said selected pressure and another of said pressure responsive devices to a selected lesser pressure, an opening for venting said selected lesser pressure to atmosphere, and piston means actuated by the differential between said servo pressure and said selected lesser pressure for varying said opening.

9. A device as described in claim 8 wherein said member is connected to means for automatically compensating for changes in altitude.

10. A pressure regulator, comprising means for providing and controlling a servo pressure as a function of a selected pressure, and means for controlling a selected lesser pressure in direct proportion to said servo pressure over a predetermined range of said selected pressure by bleeding off said selected lesser pressure, said first mentioned means including a linearly movable member and pressure responsive means operatively connected to said member for causing linear movement thereof, said pressure responsive means being responsive to changes in at least one of said plurality of pressures.

11. A device as described in claim 10 wherein said member is connected to means for automatically compensating for changes in altitude.

References Cited

UNITED STATES PATENTS

| 2,886,968 | 5/1959 | Johnson et al. | 230—114 |
| 3,035,408 | 5/1962 | Silver | 230—114 |
| 3,298,600 | 1/1967 | Likavec | 230—114 |

HENRY F. RADUAZO, *Primary Examiner.*